United States Patent [19]
Clachan et al.

[11] 3,775,160

[45] *Nov. 27, 1973

[54] HYDROPHOBIC FILM COATED WITH ACID-MODIFIED BUTADIENE COPOLYMER

[75] Inventors: Margaret Loudon Clachan, Manningtree; Gordon Edmund Alfred Pears, Welwyn Garden City, both of England

[73] Assignee: Imperial Chemical Industries Limited, London, England

[ * ] Notice: The portion of the term of this patent subsequent to Oct. 26, 1988, has been disclaimed.

[22] Filed: May 11, 1971

[21] Appl. No.: 142,407

Related U.S. Application Data

[62] Division of Ser. No. 829,807, June 2, 1969, Pat. No. 3,615,556.

[30] Foreign Application Priority Data
June 24, 1968  Great Britain................... 30,029/68

[52] U.S. Cl.......... 117/76 F, 96/87 R, 117/138.8 F, 117/161 UD
[51] Int. Cl............................................. G03c 1/80
[58] Field of Search.............. 96/87 R; 117/161 UD, 117/76 F, 138.8 F

[56] References Cited
UNITED STATES PATENTS

| 3,615,556 | 10/1971 | Clachen et al...................... 96/87 R |
| 3,506,445 | 4/1970 | Abbott et al......................... 96/87 R |

*Primary Examiner*—Ronald H. Smith
*Attorney*—Cushman, Darby & Cushman

[57] ABSTRACT

A hydrophobic film is coated with an ethylenically unsaturated acid-modified butadiene copolymer and a light sensitive gelatin-silver halide emulsion layer.

8 Claims, No Drawings

HYDROPHOBIC FILM COATED WITH ACID-MODIFIED BUTADIENE COPOLYMER

This application is a divisional application of Ser. No. 829,807, filed June 2, 1969, now U.S. Pat. No. 3,615,556.

This invention relates to film base materials suitable for use, inter alia, as base materials for photographic films carrying a coating of a gelatino silver halide photographic emulsion.

A wide variety of self-supporting film materials have been proposed for use as supports in the production of photographic film. Generally such film materials are essentially hydrophobic in character and materials such as polyethylene terephthalate, which because of its chemical and physical properties is increasingly in use for the purpose, are highly hydrophobic.

In the production of photographic materials using such film supports, where the light sensitive layer is a gelatino silver halide layer there is considerable difficulty in securing adequate anchorage between the essentially hydrophilic emulsion layer and the hydrophobic support film, especially bearing in mind that the anchorage must remain unaffected by the quite vigorous chemical treatments to which the photographic film will be subjected in the processing of the photographic image.

It is known that the anchorage may be improved by the introduction, between the film support and the hydrophilic layer applied thereto, of one or more interlayers of suitable film-forming polymeric materials. Many such proposals have been made in the past and have met with varying degrees of success. It is an object of the present invention to provide a film base which comprises a hydrophobic film support having a layer coated thereon and which is adapted to receive a hydrophilic coating and thereby to establish an assembly of which the layers are very strongly anchored together.

According to the present invention there is provided a coated film base material which comprises a support film of synthetic film-forming material of hydrophobic character and superimposed thereon a layer of a composition comprising a copolymer of (1) butadine, (2) an ethylenically unsaturated carboxylic acid, and (3) at least one other ethylenically unsaturated monomer copolymerisable therewith, the said copolymer containing from 18 to 70 percent by weight of butadiene units and from 0.5 to 20 percent by weight of units of the ethylenically unsaturated carboxylic acid.

The support film may be of any plastics material, especially such materials as are highly hydrophobic, examples being films consisting essentially of polyolefines such as polyethylene, polypropylene, poly-4-methyl pentene-1, and copolymers of such olefines with each other or with other ethylenically unsaturated monomers, polyesters such as polyethylene terephthalate and synthetic linear polycarbonates, and cellulose derivatives such as cellulose diacetate or triacetate or acetobutyrate. The support film may be molecularly oriented in one or two directions in its plane before and/or after the application of the anchoring layer thereon. It may also be heat set. The invention is of particular value where the film material is biaxially oriented and heat set polyethylene terephthalate both because that material has physical and chemical properties rendering it particularly suitable for the production of photographic materials and because, being highly hydrophobic, the advantages achieved by the present invention are achieved to excellent effect.

If desired, before the application of the copolymer anchoring coat the surface of the film may be subjected to a treatment designed to render it somewhat more capable of readily accepting the copolymer coating. The nature of such pre-treatment will vary, of course, with the film material in use but in the case of materials such as the polyolefines the film may be usefully subjected to a high voltage stress accompanies by corona discharge (commonly referred to as C-treatment) or subjected to treatment with strong oxidising agents such as fuming sulphuric acid, nitric acid, potassium dichromate or the like. Where the film material is polyethylene terephthalate a useful effect is obtained by pretreatment with trichloracetic acid or a halogenated phenol. In a modification of this aspect of the invention treatment with the organic materials just mentioned may be effected simultaneously with the application of the copolymer layer by including such organic materials in the composition of such layer.

Generally speaking, the base film material is oriented. As stated above, the copolymer anchor coat may be applied before the orientation is completed and in this case, pretreatment of the base film surface is not normally necessary. This method also has the advantage that very thin coatings may be applied uniformly to the base film. Thus coat weights of from 0.8 mg/dm$^2$ to 4.0 mg/dm$^2$ of the biaxially oriented film may be applied in this way. As indicated above the copolymer used in the present invention is a copolymer of three monomeric materials. Of these one is butadiene, which must be present in a proportion of 18 to 70 percent by weight of the final copolymer. The second monomer is an ethylenically unsaturated acid and examples are acrylic acid, methacrylic acid, fumaric acid, itaconic acid, maleic acid and crotonic acid. It is to be understood that in the production of the copolymer the anhydrides of such acids may be used instead of the acids themselves. The third component is another ethylenically unsaturated monomer and may be, for example, styrene, α-methyl styrene, methyl methacrylate or acrylonitrile.

The proportion of butadiene in the copolymer may vary (within the limits of 18 to 70 percent by weight referred to above) in dependence on the nature of the other monomers present, and in dependance on the properties required in the coated film which in turn may depend on whether it is to be immediately coated with a further coating e.g., based on gelatin or whether it will first be reeled. Thus, for example, if the proportions of butadiene is too great, particularly when the third component of the copolymer is styrene or methyl methacrylate, the composition may become too soft and give rise (when coated on to film material) to a final film base which shows the phenomenon of blocking, e.g., when wound on a reel. This effect is particularly marked at concentrations of butadiene greater than 60 percent and even at concentrations above 30 percent is a noticeable feature of the coated film. To produce the best non-blocking coated film base according to our invention therefore we prefer to use concentrations of butadiene in the range 18–30 percent. In some cases, however, e.g., when the subsequent gelatin coating or coatings are immediately applied without any intermediate reeling stage or when it is admissable to include anti-blocking agents in our composition, concentrations of from 30 percent to 60 percent preferably from 32 percent to 40 percent by weight of butadiene may be used and are indeed preferred because of the better film-forming properties of the resultant composition. When the third component is acrylonitrile, higher proportions of butadiene (e.g., 50 to 70 percent) generally afford the best results.

In terms of the second component, the unsaturated acid, it is found that itaconic acid is particularly useful since this acid leads to excellent adhesion at relatively low concentrations. Thus a preferred copolymer contains, in addition to the butadiene and the third component, from 1 to 7 percent itaconic acid, optionally with up to 5% of another ethylenically unsaturated carboxylic acid.

The copolymer may be applied to the film material by any conventional coating technique and is preferably applied in the form of an aqueous latex, the aqueous medium being dried off, e.g., in an oven at a temperature above 100°C. The aqueous latex may contain additives for special purposes, e.g.

i. Wetting agents and emulsifiers for imparting stability and wettability, e.g., sodium lauryl sulphate, nonyl phenol ethylene oxidecondensate, and cetyl trimethyl ammonium bromide.

ii. Colloid stabilisers, e.g., gelatin, polyvinyl pyrolidone and polyvinyl alcohol.

iii. Adhesion promoters, e.g., chlorophenols, resorcinol and trichloracetic acid.

iv. Cross-linking agents, e.g., hexamethoxy methyl melamine.

The coated film base as defined will accept with good anchorage a more hydrophilic layer such as a thin layer comprising gelatin which has been applied from an organic solvent or aqueous dispersion. The organic solvent or aqueous dispersion of gelatin may also contain at least one synthetic polymer or resin, adhesion promoters and cross-linking agents. There may be superimposed on this gelatin containing layer, a light sensitive gelatino-silver halide emulsion to give a photographic film product showing excellent adhesion of the assembly of layers throughout all photographic processing steps.

The film base materials of the present invention are of particular value as base materials for use in the production of photographic films comprising gelatino silver halide emulsion layers. However, the film base may be further coated with lacquer for printing, drafting or heat sealing processes or with diazonium compounds for diazotype processes.

The following Examples will serve to illustrate the invention.

EXAMPLE 1

Biaxially oriented polyethylene terephthalate was coated with a solution of 3-methyl-4-chlorophenol in methanol and dried for 2 minutes at 80°C.

A range of butadiene copolymers with composition as given in table below were then applied as aqueous latices and dried for 1 minute at 110°C to give coat weights approximately 2–3 mg/dm².

TABLE

Composition of Copolymers Wt %

| Butadiene | Styrene | Acrylonitrile | Itaconic Acid | Methacrylic Acid | Acrylic Acid |
|---|---|---|---|---|---|
| 48 | 47 | — | 5 | — | — |
| 67 | — | 31 | — | 2 | — |
| 38 | 58 | — | 4 | — | — |
| 38 | 54 | — | 3 | — | 5 |

An aequeous solution of gelatin containing 3 percent formaldehyde on weight of gelatin was coated onto the layer of butadiene copolymer and dried to give a coat weight of approximately 2 mg/dm².

EXAMPLE 2

An aqueous latex containing a copolymer of butadiene, styrene and itaconic acid 38:58:4 parts by weight, was applied to polyethylene terephthalate film which had been stretched longitudinally. After drying, the coated film was stretched sideways by a factor of 3 at 100°C and heat set at a temperature of 210°C for 1 minute.

A gelatin layer was then applied as in Example 1. The film blocked if reeled prior to the application of the gelatin layer.

EXAMPLE 3

An aqueous latex containing a copolymer of butadiene, styrene and itaconic acid 20:75:5 parts by weight, was applied to polyethylene terephthalate film which had been stretched longitudinally. After drying the coated film was stretched sideways by a factor of 3 at 110°C and heat set at a temperature of 210°C for 1 minute. The weight of the coating on the biaxially drawn and heat set film was 1.5 mg/dm². The resultant film was capable of being reeled without any blocking occurring at room temperature, and was so reeled. A gelatin layer of the type described in Example 1 was then applied to the film.

A photographic gelatino silver halide emulsion coating was applied directly on the top coating of the film products of Examples 1, 2 and 3. The layers were strongly adherent to one another and to the film support so that the final photographic film could be processed without danger of separation of the layers or frilling.

We claim:

1. A coated film base material which includes a support film of synthetic film-forming material of hydrophobic character having superimposed thereon at least two layers comprising a first layer adjacent said support film and a second layer consisting essentially of gelatin applied over the first layer, said first layer having a composition comprising a copolymer of (1) butadiene, (2) an ethylenically unsaturated carboxylic acid, and (3) at least one other ethylenically unsaturated monomer copolymerisable therewith, said copolymer containing from 18 to 70 percent by weight of butadiene units and from 0.5 to 20 percent by weight of units of the ethylenically unsaturated carboxylic acid.

2. A coated film base material according to claim 1, in which the support film is of biaxially oriented and heat set polyethylene terephthalate.

3. A coated film base material according to claim 1, in which said copolymer contains, as the ethylenically unsaturated acid, itaconic acid.

4. A coated film base material according to claim 3, in which the said copolymer contains from 1.0 to 7.0 percent by weight of itaconic acid.

5. A coated film base material according to claim 1, in which said copolymer contains from 30 to 60 percent by weight of butadiene units.

6. A coated film base material according to claim 5, in which said copolymer contains from 32 to 40 percent by weight of butadiene units.

7. A coated film base material according to claim 1, in which said copolymer contains from 18 to 30 percent by weight of butadiene units.

8. A coated film base material according to claim 1, in which the coat weight of the first layer is from 0.8 mg/dm$^2$ to 4.0 mg/dm$^2$.

* * * * *